Patented Feb. 18, 1936

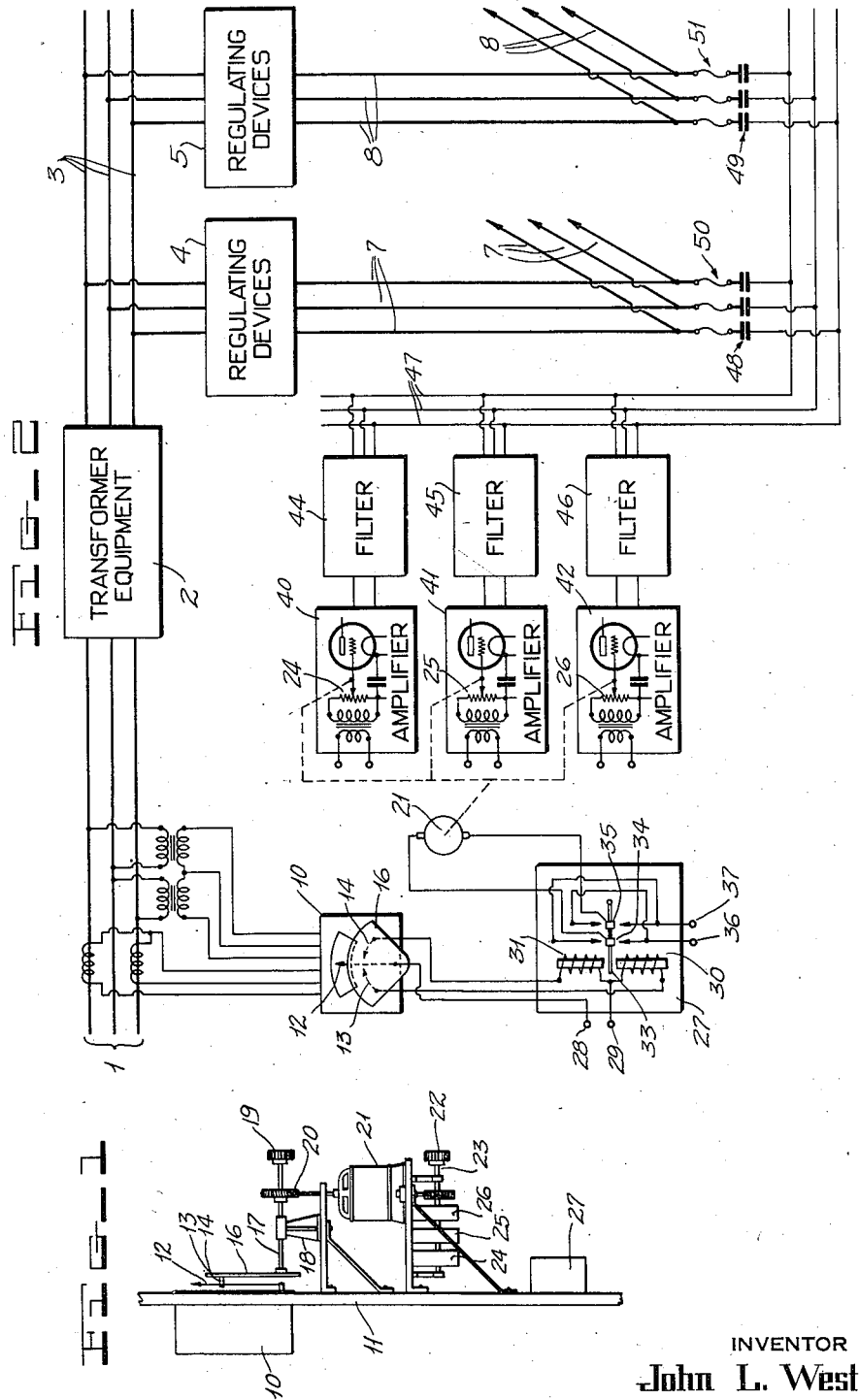

2,030,948

UNITED STATES PATENT OFFICE 2,030,948

CONTROL CIRCUIT

John L. Weston, East Orange, N. J., assignor to Wired Radio, Inc., New York, N. Y., a corporation of Delaware Application March 8, 1934, Serial No. 714,659

7 Claims. (Cl. 179—2.5)

My invention pertains in general to electrical control circuits and particularly relates to a system for controlling signalling energy for broadcasting purposes.

My invention contemplates providing means for the more efficient transmission of signalling energy over wire lines which are utilized for plural transmission purposes. For example, in the use of commercial power lines for the transmission of carrier frequency energy for program broadcasting purposes, my invention contemplates increasing the efficiency and usefulness of the system with respect to the carrier frequency reception by adjustment of the carrier frequency energy in accordance with varying conditions of commercial energy consumption loads.

One of the objects of my invention consists in providing a plural purpose transmission system in which various forms of energy are transmitted, and in which one form of energy is adjusted in value to meet changing conditions attendant the transmission of another form of energy.

Another object consists in providing a transmission system employing a common medium for the distribution of different forms of electrical energy with means for adjusting the magnitude of one form of transmitted energy proportionally to the consumption demand for another form of energy transmitted over the same medium.

A still further object of my invention comprises providing a wired radio broadcasting system in which a plurality of carrier frequency programs are transmitted over a power distribution network and in which means are provided for automatically adjusting the energy level of the carrier frequency program signals in accordance with the energy level of the commercial alternating current transmitted over the distribution network.

In the drawing which accompanies and forms a part of this specification and in which like reference numerals designate corresponding parts throughout:

Fig. 1 represents one form of the construction of automatic energy level controlling apparatus employed in my invention; and Fig. 2 is a diagrammatic representation of a form of the circuit arrangements employed in the control system of my invention.

Referring to the drawing in detail, and particularly to Fig. 2, commercial power lines 1 connect with transformer equipment 2 for supplying three-phase commercial alternating current thereto. The transformer equipment 2 may be located in a substation and the lines 1 connected with suitable generation apparatus at a central power station. The circuit output of the transformer equipment 2 includes bus lines 3 which supply commercial alternating current through suitable regulating devices 4 and 5 to a plurality of feeder systems represented by the feeder lines 7 and 8. The feeder lines 7 and 8 connect with secondary transformer equipment for supplying commercial alternating current at voltages suitable for consumers' use.

On the input side of the transformer equipment 2, suitable inductive couplings are provided in association with the line 1 for operating a watt-meter 10. The watt-meter 10 indicates the instantaneous value of the commercial energy utilized by transformer equipment 2 for distribution through the bus systems to the consumers' commercial power consuming devices. Referring to Fig. 1, it will be seen that the meter 10 is mounted upon a suitable panel 11 and is provided with an indicating needle 12. The needle 12 operates between two contacts 13 and 14 (see Fig. 2) which are mounted upon an insulating sector 16. The sector 16 is secured to a shaft 17 aligned with the pivot center of the needle 12. The shaft 17 is rotatably mounted in bearing member 18 and is provided with a manual knob 19 as well as a gear coupling 20 which transmits rotary motion from a reversible motor 21 to the shaft 17. The armature shaft of the motor 21 is also mechanically coupled by gears with another shaft 23 which rotatably operates three potentiometers 24, 25, and 26. Knobs 19 and 22 are mechanically arranged so that the potentiometer or disc 16 may be adjusted by hand if desired or required. A reversing switch unit 27 is also mounted upon the panel 11 for purposes which will hereinafter be apparent.

Referring back to Fig. 2, terminal 28 is connected with needle 12 while terminal 29 is commonly connected to one side of electromagnets 30 and 31. The other side of electromagnets 30 and 31 are connected with the contacts 13 and 14, respectively. The terminals 28 and 29 may be connected with any suitable source of energy for actuating the electromagnets 30 and 31. These electromagnets are positioned for actuation of a movable armature 33 bearing a pair of insulated contacts 34 and 35. Contacts 34 and 35 connect with the motor 21. Terminal 36 is connected with a pair of contacting members positioned on opposite sides of the armature 33 and engageable with contacts 34 and 35, respectively, depending upon which of the magnets 30 or 31 actuates armature 33. Terminal 37 is similarly connected but in a reverse manner so that when suitable energy is applied to terminals 36 and 37 the connections to motor 21 may be reversed at will depending upon the direction of operation of armature 33. The armature 33 is provided with suitable springs not shown for maintaining a normal position intermediate the electromagnets 30 and 31 so that the contacts 34 and 35 are normally not in engagement with any of the connections to motor 21. Such an arrangement comprises the reversing unit 27 employed in my system for determining the direction of operation of motor 21.

Suitable input connections are provided to amplifiers 40, 41, and 42, for supplying modulated carrier frequency energy thereto. Carrier frequency energy independently supplied to these amplifiers may be modulated in accordance with desired programs, each of the carrier frequencies being of a different value. The potentiometers 24, 25, and 26, control the signalling energy level in each of the amplifiers 40—42. The output circuits of these amplifiers are respectively connected with filters 44, 45, and 46 which each include band frequency segregation means as well as phase conversion means so that, as a whole, the three filters operate to deliver three phase carrier frequency energy in a plurality of discrete program carrier frequency ranges to a bus system 47 comprising three different phase lines. The phase lines of the bus system 47 respectively connect through coupling condensers 48 and 49 and protective fuses 50 and 51 to the feeder lines 7 and 8 whereby carrier frequency energy at a plurality of discrete program frequencies is transmitted over the power distribution network in conjunction with the commercial alternating current.

In the operation of my system, the meter 10 provides indications of instantaneous values of the commercial energy consumption, the needle 12 being moved in accordance with these values. The needle 12, in an indication of a higher commercial energy level, will move to the right, thereby engaging with contact 14. As soon as the needle 12 engages with contact 14, a circuit is completed to electromagnet 31. Energization of electromagnet 31 actuates armature 33 so that the contacts 34 and 35 complete an energizing circuit to motor 21. Energization of motor 21 simultaneously causes the movement of potentiometers 24—26 and movement of sector 16 in a direction similar to the movement of needle 12. As soon as the sector 16 has moved to a position approximating the new position of the needle 12, the contact 15 will be moved out of engagement with needle 12, thereby interrupting the circuit to the electromagnet 31 whereby the armature 33 is released to its normal position and the motor 21 deenergized. Deenergization of the motor 21 will cause the disc 16 and potentiometers 24—26 to be brought to rest. It will of course be understood that any suitable damping means may be provided, if required, for preventing excessive or undesirable movement of either the disc 16 or potentiometers 24—26.

Any increase in the commercial alternating current consumption will cause a corresponding movement of the needle 12 and a corresponding adjustment of the potentiometers 24—26 in the separate amplifiers 40—42 so that the carrier frequency energy level is maintained proportional to the instantaneous commercial energy transmitted conjointly therewith over the power lines 7 and 8. On the other hand, if the commercial energy is decreased, the needle 12 moves in a reverse direction so that the contact 13 completes an energizing circuit to electromagnet 30. The armature 33 is then moved in a reversed direction for completing a reversed energizing circuit to motor 21. The disc 16 is then moved in a reversed direction following the movement of the needle 12, but interrupted when the disc 16 has moved the required distance. The potentiometers thus being moved in a reversed direction will decrease the signalling energy level in the amplifiers 40—42 so that the signalling energy level is decreased in proportion to the decrease in the value of the commercial alternating current transmitted over the same bus lines.

In accordance with my invention such adjustments may be almost continuously required depending upon changing distribution conditions, and will be particularly required when the commercial current demand curve abruptly arises such as in the evening when a great many consumers' lighting systems and the like are put into operation within a short time. The method of my invention provides for such contingencies and insures that the carrier signalling energy delivered to the consumers shall be maintained at an efficient level in proportion to the commercial energy consumption. The apparatus of my invention insures the continuous automatic adjustment of the relationship between the commercial energy and the program energy for most efficient operation. Although I have disclosed a preferred embodiment of my system as one means for carrying out my method, it will of course be apparent that changes can be made without departing from the intended scope of my invention. I do not therefore desire to limit myself thereto except insofar as may be pointed out in the appended claims.

What I claim as new and original and desire to secure by Letters Patent of the United States is:

1. The method of supplying commercial electrical energy and signalling electrical energy to a load distribution network comprising adjusting the signalling energy level in accordance with variations in the commercial energy level.

2. The method of transmitting signal modulated and non-signal electrical energy over a common transmission medium to a consumer for use at said consumer's premises which comprises, adjusting the energy level of one form of said energy in accordance with the variations in the energy level in the other form of said energy transmitted through said medium.

3. The method of transmitting signalling electrical energy over a commercial electrical power distribution network which comprises adjusting the instantaneous energy value of the signalling energy impressed upon the power lines in accordance with the instantaneous energy level of the commercial power applied to said network.

4. The method of transmitting signalling electrical energy over wire lines through which commercial electrical energy of varying magnitudes is transmitted comprising, maintaining a continuous proportionality between said signalling energy and said commercial energy.

5. A system of transmitting modulated carrier frequency energy to a consumer's premises over wire lines also carrying to said consumer's premises other, non-signal electrical energy having variations in energy level comprising, means responsive to said variations, and means for supplying said carrier frequency energy at energy levels controlled by said last mentioned means.

6. A transmission system comprising, a power distribution network, means for supplying commercial energy to said network, means for detecting the instantaneous energy level of said commercial energy, means for supplying carrier frequency energy to said network, and means for controlling the energy level of said carrier frequency energy under control of said detecting means.

7. A control system comprising, a power distribution network, means for supplying commercial energy to said network, a device having a member movable in response to changes in said commercial energy level, movable means having contacts selectively engageable by said member depending upon its direction of movement, reversible motor means controlled by said contacts, the direction of said motor means being determined by the selective engagement of said member with said contacts, carrier frequency circuit means for supplying carrier frequency energy to said distribution network, and energy adjusting means for controlling the carrier frequency energy level, said last mentioned means being operated by said motor means for automatically maintaining the carrier frequency energy level in accordance with the commercial energy level.

JOHN L. WESTON.